United States Patent [19]

Stapfer et al.

[11] 3,884,980

[45] May 20, 1975

[54] ALDOL CONDENSATION USING COBALT II HALIDE HYDRAZINE COMPLEXES

[75] Inventors: Christian H. Stapfer, Newton; Richard W. D'Andrea, New Hope, both of Pa.

[73] Assignee: Cincinnati Milacron Chemicals, Inc., Reading, Ohio

[22] Filed: Sept. 16, 1971

[21] Appl. No.: 181,214

Related U.S. Application Data

[62] Division of Ser. No. 26,161, April 6, 1970, Pat. No. 3,728,087.

[52] U.S. Cl............. 260/586 C; 260/590; 260/593; 260/594
[51] Int. Cl...................... C07c 45/00; C07c 49/04
[58] Field of Search.... 260/586 C, 590, 594, 593 R; 423/413, 462

[56] References Cited
UNITED STATES PATENTS

| | | | |
|---|---|---|---|
| 2,719,863 | 10/1955 | Haslam | 260/586 C |
| 3,316,303 | 4/1967 | Metzweiller | 260/586 C |
| 3,364,243 | 1/1968 | Daniels | 260/439 R |
| 3,649,663 | 3/1972 | Stoffer et al. | 260/439 R |

OTHER PUBLICATIONS

Nicholls et al.: Hydrazine Complexes of Cobalt (II) Chloride, J. Chem. Soc. (A) 1966, pp. 950–952.

*Primary Examiner*—Oscar R. Vertiz
*Assistant Examiner*—Gary P. Straub
*Attorney, Agent, or Firm*—Cushman, Darby and Cushman

[57] ABSTRACT

Cobalt (II) halide trihydrazinates of the formula $$[Co(II) (R - NH - NH_2)_3] X_2$$

are prepared as well as Cobalt (II) halide tris(hydrazine hydrochloride) complexes of the formula $$[Co(II) (N_2H_4 \cdot HX)_3] X_2$$

where R is H, alkyl, aryl, haloaryl and X is halogen. The compounds are useful as driers for alkyd resins and to accelerate the oxidative polymerization of olefinic polymer systems, particularly unsaturated polyesters, in conjunction with organic peroxides and as promoters for ketone aldol condensation. Known Co II complexes of the formula $[Co(II) (R - NH - NH_2)_2] X_2$ also have these same uses.

9 Claims, No Drawings

ALDOL CONDENSATION USING COBALT II HALIDE HYDRAZINE COMPLEXES

This is a division of application Ser. No. 26,161, filed Apr. 6, 1970, now U.S. Pat. No. 3,728,087.

This invention relates to novel cobalt complexes and their use in drying alkyd coating compositions, autoxidation of olefinic materials and in ketone aldol condensations.

Hydrazines are known to form stable coordination complexes, or chelates, with transition metals. With cobaltous halides they form 2 to 1 complexes known as the dihydrazinates which are described in the literature. Hydrazine itself reacts readily with cobalt (II) chloride, for instance to form the dihydrazinate complex: $[Co(II) (N_2H_4)_2]Cl$ and under certain conditions, the unstable hexahydrazinate $[Co(II) (N_2H_4)_6]Cl_2$ can be formed in which the hydrazine acts as a unidentate ligand.

The term "paint" is used herein to include oil-based paint, water-based and organic-based varnishes, lacquers and similar coating compositions which may be clear, pigmented, or contain dyes.

The curing or drying of coating compositions such as alkyd paint formulations is frequently catalyzed by various metal salts. Cobalt soaps are especially preferred as paint dryers because they most actively promote the formation of free radicals at loci of unsaturation in films of coatings and paint. The production of these free radicals catalyze an autoxidation process resulting in actual crosslinking within the film. However, cobalt salts have had several disadvantages prior to my invention. In addition to high cost, cobalt salts cause extensive wrinkling in paint films when used in amounts necessary to produce commercially desirable drying times. It has been usually necessary to replace a portion of the cobalt salt with a salt of a less expensive metal because of the high cost and in order to prevent wrinkling, the replacement of the amount of cobalt salt necessary to prevent wrinkling results in a substantial increase in the time required for drying. Attempts have been made to accelerate the drying of alkyd paints by including compounds such as 1,10-phenanthroline, 2,2'-bipyridine or 8-hydroxyquinoline. While these accelerators have been used for cobalt and manganese drying catalysts, they have not attained significant commercial importance. Although they may be good accelerators, these compounds are far too expensive to be used in the necessary amounts and also promote discoloration of the paint film. For example, 1,10-phenanthroline cannot be used in quantities exceeding 0.05 weight per cent of the paint because higher concentrations cause the paint film to yellow and when used in levels of 0.05 weight per cent, the acceleration of drying time is not sufficient to off-set the increase in cost.

Hydrazines have also been proposed as activators in drying alkyd paints but they cause extreme discoloration (yellowing), surface wrinkling and deterioration. Moreover, they are not as active as would be desired.

It is also well known that the crosslinking polymerization of olefinic polymers such as styrene or butadiene modified polyester resins proceed by oxygen transfer using organic peroxides as a source of free radical and the same cobalt carboxylates as above as cocatalysts. Although cobalt soaps are the preferred cocatalysts for the polymerization of these resins, mainly because they allow good curing characteristics and dimensional stability, the time span in which they cause the polymeric resin to gel is long, and should one want to reduce said time span by increasing the amount of cobalt, they have a tendency to severely discolor the resin.

Furthermore, in various applications where the polyester resin formulation contains water, cobalt carboxylates are altogether inadequate to promote crosslinking.

The use of various pyridine compounds including 2-pyridine aldazine has been proposed as accelerators for cobalt and other driers in Wheeler U.S. Pat. No. 2,961,331. However, the pyridine aldehydes required to make the azines are expensive. Furthermore, it was considered essential to have the pyridine nucleus present.

It is an object of the present invention to prepare novel trihydrazine cobalt complexes.

Another object is to prepare novel cobalt trihydrazinate hydrochloride complexes.

A further object is to provide novel driers for drying alkyd coating compositions and unsaturated polyesters.

An additional object is to provide a novel procedure for preparing ketone aldol condensations.

It has now been found that these objects can be attained by preparing novel cobalt II halide trihydrazinates of the formula (1) $[Co(II) (R—NH—NH_2)_3]X_2$ or (2) $[Co(II) (N_2H_4 . HX)_3]X_2$ where R is H, alkyl, aralkyl, aryl or haloaryl and X is halogen and the use of these compounds or the known cobalt II dihydrazinates of the formula (3) $[Co(II) (R—NH—NH_2)_2]X_2$ for curing drying alkyd resins and as curing agents in other oxidative polymerization reactions such as crosslinking of olefin polymer systems, particularly unsaturated polyesters initiated by organic peroxides. The compounds of the present invention are preferably employed as the sole cobalt source in such curing systems, but they can be replaced in part, e.g. up to 90 percent, by conventional cobalt driers, e.g. cobalt 2-ethylhexoate, cobalt naphthenate, cobalt neodecanoate, cobalt resinate, etc.

The compounds of the present invention of formulae (1) and (2), as well as the old compounds of formula (3), are also useful as catalysts in the aldol condensation of ketones.

The compounds of the present invention are extremely sensitive to heat and oxidation and preferably are stored in an inert atmosphere, e.g. nitrogen, helium or argon at a low temperature, e.g. 0°C. Since in many instances the bromides and iodides tend to decompose violently when exposed to air, it is preferred to employ the chlorides.

It has been found that under anhydrous conditions, hydrazines react with 2,2'-bipyridyl cobalt (II) halide complexes to form, by ligand displacement, quantitative amounts of the corresponding cobalt (II) halide trihydrazinate complexes, a typical equation being $$[Co(II) (Bipy)]Cl_2 \xrightarrow{solvent} [Co(II) (N_2H_4)_3]Cl_2$$

As stated, many of these new complexes have limited stability, tend to become pyrophoric when exposed to air and sometimes lead to explosive decompositions.

When aryl substituted hydrazines are reacted with cobaltous halides, the formation of the trihydrazinate is hindered by the size of the halogen atom rather than the size of the aryl group. It is thus easier to prepare the tris(phenyl hydrazine) complex of cobalt (II) chloride than the bromide analog.

Furthermore, there can be prepared tris(hydrazine hydrochloride) complexes of cobalt (II) halides previously unknown. These chelates have the particular merit of being extremely water soluble and are useful as homogeneous catalysts in that medium.

Cobalt (II) chloride trihydrazinate hydrochloride [Co(II) (N$_2$H$_4$.HCl)$_3$]Cl$_2$ was prepared by reacting benzalhydrazone with hydroxylamine hydrochloride in presence of cobaltous chloride. Beside the desired complex, quantitative amounts of benzaldoxime were isolated:

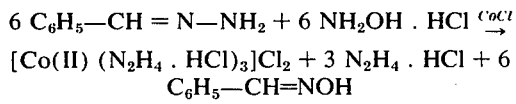

While not being limited to theory, it is believed that the reason why the excessive stoichiometry is needed in the reaction above is that, in order to obtain the trishydrazinate hydrochloride, one first forms the unstable hexahydrazinate hydrochloride, an unidentate complex which, upon ligand displacement, leads to the desired chelate and free hydrazine hydrochloride:

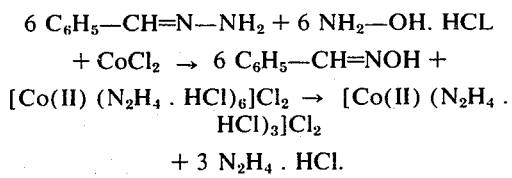

As opposed to the well known tetrahedral or planar configuration of the cobalt (II) halide dihydrazinates in which the cobalt is tetracoordinate (FIG. 1A), the new trihydrazinates and trihydrazinates-hydrochlorides are believed to have an octahedral Werner configuration with the hexa coordinated cobalt (FIG. 1b).

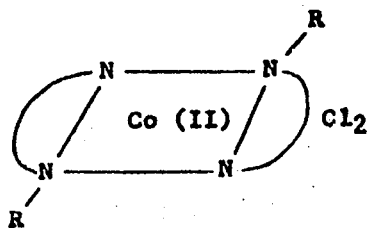

Planar configuration of
[Co(II) (R-NH-NH$_2$)$_2$]Cl$_2$

Fig. 1a

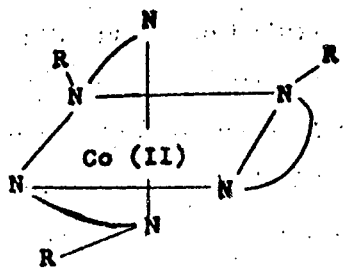

Octahedral configuration of
[Co(II) (R-NH-NH$_2$)$_3$]Cl$_2$

Fig. 1b

Whether in their anhydrous solid form or in solution in various organic solvents such as ketones, aldehydes, amides, esters, alcohols or amines, the cobalt (II) halido dihydrazinates and, to a higher degree, trihydrazinates have been found to be very potent catalysts in various chemical processes involving oxygen transfer reactions. Typical solvents which can be used to dissolve the chelates mentioned above are: cyclohexanone, benzaldehyde, dimethyl formamide, dimethyl sulfoxide, n-propyl alcohol, propylene glycol, methylacetoacetate, acetic anhydride, N,N, dimethyl aniline, acetone, methyl ethyl ketone, methyl amyl ketone, isophorone, diethyl ketone, di-n-propyl ketone, diisopropyl ketone, di-n-butyl ketone, diisobutyl ketone, di sec butyl ketone, di-t-butyl ketone, di-n-amyl ketone, methyl-n-propyl ketone, pinacolone, 6-methyl-2-heptanone, methyl n-octyl ketone, ethyl n-butyl ketone, 1-hydroxy-2-propanone, 3-hydroxy-2-butanone, diacetone alcohol, cyclobutanone, cyclohexanone, 2-methyl cyclohexanone, cycloheptanone, fenchone, acetophenone, benzophenone (molten), biacetyl, acetyl propionyl, acetyl acetone, mesityl oxide, hexanone-3, furfural, acetaldehyde, propionaldehyde, butyraldehyde, isobutyraldehyde, valeraldehyde, heptaldehyde, glyoxal, o-chlorobenzaldehyde, p-tolualdehyde, salicylaldehyde, phenylacetaldehyde, tetrahydrofurfural, glutaraldehyde, anline, N,N-diethyl aniline, N-methyl aniline, propyl amine, isopropyl amine, butyl amine, decyl amine, diethyl amine, dipropyl amine, diisobutyl amine, diamyl amine, methyl ethyl amine, triethyl amine, tributyl amine, ethylene diamine, cyclohexyl amine, dicyclohexylamine, o-toluidine, p-toluidine, m-toluidine, p-2-xylidene, o-chloroaniline, p-phenetidine, N-ethyl aniline, dimethyl acetamide, isopropyl alcohol, ethyl alcohol, methyl alcohol, butyl alcohol, sec. butyl alcohol, hexyl alcohol, isooctyl alcohol, 2-ethylhexanol, n-octyl alcohol, decyl alcohol, isodecyl alcohol, dodecyl alcohol, ethylene glycol, glycerine, dipropylene glycol, diethylene glycol, mono butyl ether of diethylene glycol, hexamethylene glycol, polyethylene glycol molecular weight average 500, propionic anhydride, ethyl acetate, propyl acetate, amyl acetate, benzyl acetate, butyl acetate, cyclohexyl acetate, phenyl acetate, ethyl propionate, methyl butyrate, amyl valerate, heptyl laurate, ethyl palmitate, diethyl oxalate, dimethyl malonate, dimethyl adipate, diethyl sebacate, butyl lactate, methyl benzoate, ethyl benzoate, dioctyl phthalate, dibutyl phthalate, methyl salicylate, ethyl acetoacetate, phenyl acetoacetate.

In making the compounds of formula (1), there are employed cobalt II bipyridine complexes such as cobalt (II) bipyridine difluoride, cobalt (II) bipyridine dichloride, cobalt (II) bipyridine dibromide, cobalt (II) bipyridine diiodide. As hydrazines there can be used hydrazine, phenyl hydrazine, p-tolyl hydrazine, methyl hydrazine, allyl hydrazine, isopropyl hydrazine, n-hexadecyl hydrazine, octadecyl hydrazine, cyclohexyl hydrazine, benzyl hydrazine, 2-naphthyl hydrazine, 2-chlorophenyl hydrazine, phenylethyl hydrazine, 4-bromophenyl hydrazine, 2-fluorophenyl hydrazine, 2,4-dichlorophenyl hydrazine, octyl hydrazine, p-ethylphenyl hydrazine.

Any desired solvent can be used such as those set forth above.

Examples of compounds within formula (1) (cobalt always having a valence of 2) are cobalt trihydrazinate dichloride, cobalt trihydrazinate difluoride, cobalt trihydrazinate dibromide, cobalt trihydrazinate diiodide, cobalt tris(phenylhydrazinate) difluoride, cobalt tris(phenylhydrazinate) dichloride, cobalt tris(phenylhydrazinate) dibromide, cobalt tris(phenylhydrazinate) diiodide, cobalt tris(p-tolylhydrazinate) dichloride, cobalt tris (o-tolylhydrazinate) dibromide, cobalt tris (methylhydrazinate) dichloride, cobalt tris (ethylhydrazinate) dibromide, cobalt tris (allylhydrazinate) dichloride, cobalt tris (isopropyl hydrazinate) dichloride, cobalt tris (n-hexadecyl hydrazinate) dichloride, cobalt tris (n-octadecylhydrazinate) dichloride, cobalt tris (cyclohexylhydrazinate) dichloride, cobalt tris (benzylhydrazinate) dichloride, cobalt tris (2-naphthylhydrazinate) dichloride, cobalt tris (2-chlorophenylhydrazinate) dichloride, cobalt tris (phenylethylhydrazinate) dichloride, cobalt tris (4-bromophenylhydrazinate) dichloride, cobalt tris (2-fluorophenylhydrazinate) dichloride, cobalt tris (2,4-dichlorophenylhydrazinate) dichloride, cobalt tris (octylhydrazinate) dichloride and cobalt tris (p-ethylphenylhydrazinate) dichloride.

In making the compounds of formula (2), there are employed cobalt (II) halides such as cobalt (II) fluoride, cobalt (II) chloride, cobalt (II) bromide and cobalt (II) iodide together hydroxylamine hydrochloride, hydroxylamine hydrobromide and hydroxylamine hydroiodide together with a hydrazone. Examples of hydrazones include p-bromoacetophenone hydrazone, acetaldehyde hydrazone, benzal hydrazone, p-methylbenzal hydrazone, o-tolual hydrazone, benzophenone hydrazone, acetophenone hydrazone, valeraldehyde hydrazone, cyclohexanone hydrazone, acetone hydrazone, benzophenone hydrazone, furfural hydrazone, pentanone-3-hydrazone, butanone-2-hydrazone, heptadecanone-9-hydrazone, pentacosanone-3-hydrazone, isobutyraldehyde hydrazone, n-butyraldehyde hydrazone, propional hydrazone, octaldehyde hydrazone, stearaldehyde hydrazone.

Examples of compounds within formula (2) (cobalt always having a valence of 2) are cobalt chloride trihydrazinate hydrochloride, cobalt bromide trihydrazinate hydrochloride, cobalt iodide trihydrazinate hydrochloride, cobalt fluoride trihydrazinate hydrochloride, cobalt bromide trihydrazinate hydrobromide, cobalt iodide trihydrazinate hydroiodide.

The old cobalt II halide dihydrazine complexes within formula (3) which can also be used as catalysts in the present invention can be made by conventional processes such as those disclosed in Audrieth et al., "The Chemistry of Hydrazine" (Wiley, 1951), Ahmad et al., Z. Anorg. Chem. Vol. 330, pages 210–216 (1964); Nicholls et al., J. Chem. Soc. (A) (1966) pages 950–952; Clemens et al., Inorg. Chem. (1963), Vol. 2, page 1251 and Nicholls et al., J. Chem. Soc. (1964), page 4204.

Examples of compounds within formula (3) (cobalt always having a valence of 2) are cobalt chloride dihydrazinate, cobalt bromide dihydrazinate, cobalt chloride di(phenylhydrazinate), cobalt bromide di(phenylhydrazinate), cobalt chloride di(methylhydrazinate).

The compounds of formulae (1) and (2) appear to impart faster curing than the comparable compounds of formula (3).

The polymerization of unsaturated polyesters by a crosslinking process is known to occur by free radical initiation and this is usually achieved by using organic peroxides as polymerization catalysts. While the rate of decomposition of such peroxides into free radicals is influenced by the type of peroxide and the temperature used, it is also directly influenced by the addition of accelerators or inhibitors. Accelerators promote the decomposition of peroxides into free radicals at temperatures below those required to release free radicals if the peroxide is used alone.

When treated with catalyst-accelerator combinations, standard unsaturated polyester resins show various gelation and cure characteristics which depend on the nature of the said combination. During polymerization, resins pass through a critical point at which the viscosity increases suddenly (gel point) then harden slowly while undergoing an exothermic polymerization reaction. Both the gel time and the cure exothermic heat have significant influence on the physical properties of the finished product as well as the practical workability of the resin in various applications.

In the present state of the art, cobaltous carboxylates, such as cobalt naphthenate, are among the most active accelerators available, but their limitations are still numerous and the gel time of a standard polyester resin catalyzed with methyl-ethyl ketone peroxide can merely be shortened by only 50 percent, with this accelerator. The cure time, expressed in minutes necessary to reach the polymerization's peak exotherm, takes well over the half hour and the performance cannot be improved by merely increasing the metal content of the polymer. We have found that the di and tri hydrazine cobalt (II) halide complexes described above showed catalytic activity of the order of 20 times that of cobalt carboxylates.

When used with acyl peroxides as primary catalyst these cobalt accelerators have obtained polyester gel times of a few seconds. A further advantageous feature of these accelerators is their versatility as gel-cure modifiers. The variation of the peroxide-accelerator ratio allows a multiple choice in gel times and cure rates of polyester systems following the processor's requirements. Finally, these accelerators reduce considerably the air inhibition encountered in coatings applications where the crosslinking polymerization of thin films is usually affected by the presence of relatively large amounts of oxygen. It was thus possible to cure such thin films to hardness by the mere addition of small amounts of cobalt halide hydrazine complexes as cocatalysts. The effectiveness of the cobalt hydrazine accelerators was observed at usage levels as low as 0.001 percent by weight of the resin and the accelerators can be used at levels as high as 5 percent or even 10 percent (in solution or otherwise), levels at which they cause immediate polymerizations. At higher levels the discoloration of the resin by the catalyst system is undesirable for some uses. Another area of application where cobalt II halide hydrazine complexes constitute a significant improvement over existing art is the drying of paint films. They are particularly useful as primary drying catalysts for long oil alkyd paints which usually require long drying times and relatively high metal concentrations. It is well known that various soaps of cobalt constitute the preferred paint driers as they are most susceptible to promote the autoxidation process by free radical induction at the sites of unsaturation in the paint film. As pointed out before, in the case of unsaturated polyester resins where the new catalysts overcome the air inhibition, the cobalt hydrazine complexes tend to use oxygen itself as a source of free radicals.

The superior performance observed earlier was confirmed when ketone solutions of the cobalt hydrazine complexes were used as drying catalysts at similar levels of usage, varying from 0.0001 percent, usually 0.001 to 5 percent, or more, e.g. up to 10 percent. Furthermore, we have found that the complexes described above show some characters of specificity when used as catalysts for certain aldol condensation reactions. We have found, for instance, that the self condensation of cyclohexanone catalyzed by the cobalt (II) bromide dihydrazine complex [Co (II) ($N_2H_4)_2$]$Br_2$ yields quantitative amounts of pure 1-cyclohexene-2-cyclohexanone whereas the same condensation catalyzed with the cobalt (II) chloride analog tends to promote poly condensation leading to extensive amounts of a poly cyclohexene resin.

Mesityl oxide is also obtained very easily and in high yields by self condensation of acetone catalyzed by various cobalt hydrazine complex catalysts. The amount of catalyst necessary for satisfactory completion of these condensation reactions varies with the nature of the reaction and of the catalyst. In this aldol type of condensation there can be used any of the ketones previously mentioned. The catalyst can be used to provide cobalt in the amount of 0.001 to 10 percent of the ketone.

Some homogeneous reactions such as the production of polyphenylene oxides can be catalyzed with as little as 1 percent of a cobalt halide trihydrazine in solution whereas in some heterogeneous conditions as much as 10 percent of the solid complex may be required. It is apparent from the results obtained, that the novel cobaltous halide trihydrazine complexes as well as the better known dihydrazine analogs constitute a class of highly active catalysts useful in several diverse areas of application.

In the crosslinking of olefinic polymer systems, e.g. unsaturated polyesters, there are included peroxides as is conventional in the art. The peroxide can be 0.05 to 5 percent, based on the polymer. Examples of suitable peroxides include methyl ethyl ketone peroxide, dicumyl peroxide, benzoyl peroxide, cumene hydroperoxide, di (t-butyl peroxide), m-bis (alpha-t-butylperoxyisopropyl) benzene, methyl isobutyl ketone peroxide, cyclohexanone peroxide, methyl tetrahydrofurane hydroperoxide, bis (4-chlorobenzoyl) peroxide, phthalyl peroxide, dilauroyl peroxide, t-butyl peracetate, diacetyl peroxide, di (2,4-dichlorobenzoyl) peroxide, dipelargonyl peroxide, 3,5-dihydroxy-3,5-dimethyl-1,2-dioxacyclopentane, t-butyl peroxybenzoate, t-butyl peroxy (2-ethylhexanoate) 0,0-t-butyl O-isopropyl mono peroxycarbonate, 2,5-dimethyl-2,5-di (benzoylperoxy) hexane, t-butyl peroxy (2-ethylbutyrate), 2,5-dimethyl-2,5-di (2-ethylhexanoylperoxy) hexane, di-t-butyl diperoxyphthalate, 0,0-t-butyl hydrogen monoperoxymaleate, n-butyl 4,4-bis (t-butylperoxy) valerate, 2,5-dimethyl-2,5-bis (t-butylperoxy) hexane, bis-(p-bromobenzoyl) peroxide.

Any of the conventional pigments can be employed in the paints such as titanium dioxide, ferric oxide, calcium oxide, zinc oxide, ochre, litharge, white lead, clays, e.g. kaolin and china clay, calcium carbonate, silica, talc, asbestos, diatomaceous earth, basic lead carbonate, whiting, lithopone, zinc sulfide, antimony trioxide, barium sulfate, red lead, Spanish oxide, burnt sienna, red iron oxide, Venetian red, cadmium red, cadmium sulfoselenide, cadmium-mercury sulfide, raw umber, burnt umber, sienna hydrated yellow iron oxide, chrome yellow, chrome orange, molybdenum orange, zinc chromate, basic zinc chromate, cadmium yellow, chrome green, chromium oxide green, iron blue, ultramarine, blue basic lead sulfate, carbon black, precipitated black iron oxide and metallic pigments, e.g. aluminum powder.

Conventional paint solvents can be employed such as aromatic and aliphatic hydrocarbons, e.g. benzene, toluene, xylene, aromatic naphtha, mineral spirits, isooctanes, hexane petroleum ether and VM&P naphtha, as well as water for water-based paints.

The drying accelerators of the present invention can be employed with any of the conventional drying alkyd resins and unsaturated polyesters.

The curing alkyd resins can be made from acids (or the anhydrides if available) such as phthalic anhydride, isophthalic acid, trimellitic acid, pyromellitic acid, trimesic acid, maleic anhydride, fumaric acid, azelaic acid, succinic acid, adipic acid, tetrahydrophthalic anhydride, tetrachlorophthalic anhydride, dimerized fatty acids and sebacic acid reacted with polyhydric alcohols such as glycerol, pentaerythritol, dipentaerythritol, trimethylolethane, sorbitol, trimethylolpropane, ethylene glycol, propylene glycol, neopentylene glycol and dipropylene glycol together with drying oils such as soyabean oil, linseed oil, tung oil, dehydrated castor oil, fish oil, corn oil, perilla oil, safflower oil, oiticica oil and cottonseed oil, as well as the acids of such drying oils and tall oil acids.

Unless otherwise indicated, all parts and percentages are by weight.

Typical suitable unsaturated oil or fatty acid modified alkyd resins are set forth below. They can have oil lengths of 30 to 70 or even higher.

|  | Alkyd A |  |
| --- | --- | --- |
|  | Parts |  |
| Tall oil fatty acids | 127.0 |  |
| Pentaerythritol | 73.3 |  |
| Ethylene glycol | 34.9 |  |
| Phthalic anhydride | 145.0 |  |
| Maleic anhydride | 3.0 |  |
| Acid No. | 12 |  |
|  | Alkyd B |  |
|  | parts |  |
| Soyabean Oil | 140.0 |  |
| 98% glycerol | 90.0 |  |
| Phthalic anhydride | 145.0 |  |
| Maleic anhydride | 3.0 |  |
| Acid No. | 8 |  |
|  | Alkyd C | Alkyd D |
|  | parts |  |
| Soyabean oil | 25.0 | — |
| Litharge | 0.06 | — |
| Pentaerythritol | 60.0 | 110.0 |
| Phthalic anhydride | 148.0 | 148.0 |
| Tall oil fatty acids | — | 260.0 |
| Ethylene glycol | — | 12.5 |
| Acid No. | 10 | 10 |
|  | Alkyd E | Alkyd F |
| Soyabean oil | 132.0 | 175.0 |
| Linseed oil | 132.0 | — |
| Dehydrated castor oil | — | 50.0 |
| Litharge | 0.09 | 0.05 |
| Pentaerythritol | 91.0 | — |
| Glycerol | — | 83.0 |
| Phthalic anhydride | 148.0 | 145.0 |
| Maleic anhydride | — | 3.0 |
| Acid No. | 12 | 8 |
|  | Alkyd G | Alkyd H |
|  | parts | parts |
| Tall oil fatty acids | 322.0 | 230.0 |
| Safflower oil | — | 156.0 |
| Litharge | — | 0.04 |
| Pentaerythritol | 126.0 | 109.0 |
| Phthalic anhydride | 148.0 | 148.0 |
| Acid No. | 10 | 8 |
|  | Alkyd I | Alkyd J |
|  | parts |  |
| Soyabean oil | 366.0 | — |
| Menhaden oil | — | 400.0 |

-Continued

|  | Alkyd A | |
|---|---|---|
| Litharge | 0.08 | 0.10 |
| Pentaerythritol | 81.0 | 75.0 |
| 98% glycerol | — | 23.0 |
| Phthalic anhydride | 145.0 | — |
| Isophthalic acid | — | 166.0 |
| Maleic anhydride | 3.0 | — |
| Acid No. | 10 | 12 |

|  | Alkyd K parts | Alkyd L parts |
|---|---|---|
| Tall oil fatty acids | 719.0 | 1740.0 |
| Pentaerythritol | 173.0 | 284.0 |
| Isophthalic acid | 166.0 | 166.0 |
| Acid No. | 10 | 12 |

|  | Alkyd M parts | Alkyd N |
|---|---|---|
| Linseed oil | 700.0 | — |
| Safflower oil | — | 1180.0 |
| Litharge | 0.07 | 0.08 |
| Pentaerythritol | 71.0 | 80.0 |
| Phthalic anhydride | 148.0 | — |
| Isophthalic acid | — | 166.0 |
| Acid No. | 10 | 8 |

Typical examples of unsaturated polyesters, polyester resins are set forth below. In polyesters A through I, the acid and alcohol components prereacted to the indicated acid number were dissolved in styrene to give 70 percent total nonvolatiles, i.e. the styrene was 30 percent of the composition. The final compositions also contained 0.015 percent of t-butyl catechol.

|  | Polyester A | Polyester B |
|---|---|---|
|  | parts |  |
| 1,2-propylene glycol | 1700 | 1700 |
| Maleic anhydride | 1528 | 1528 |
| Phthalic anhydride | 770 | 770 |
| Hydroquinone | 0.40 | 0.40 |
| Acid No. | 72 | 31.4 |
| Styrene | 30% of composition | 30% of composition |

|  | Polyester C parts | Polyester D |
|---|---|---|
| 1,2-propylene glycol | 1700 | 1700 |
| Fumaric acid | 1810 | 603 |
| Phthalic acid | 770 | 2309 |
| Hydroquinone | 0.42 | 0.46 |
| Acid No. | 37.1 | 26.6 |
| Styrene | 30% of composition | 30% of composition |

|  | Polyester E parts |
|---|---|
| 1,2-propylene glycol | 1700 |
| Fumaric acid | 1810 |
| Isophthalic acid | 864 |
| Hydroquinone | 0.45 |
| Acid No. | 30.3 |
| Styrene | 30% of composition |

|  | Polyester F parts | Polyester G |
|---|---|---|
| 1,2-propylene glycol | 1700 | 1370 |
| Fumaric Acid | 1447 | 1170 |
| Adipic Acid | 1095 | — |
| HET Acid | — | 2355 |
| Phthalic anhydride | 126 | 110 |
| Hydroquinone | 0.44 | 0.5 |
| Acid No. | 11.7 | 46.7 |
| Styrene | 30% of composition | 30% of composition |

|  | Polyester H parts | Polyester I |
|---|---|---|
| Diethylene glycol | 233.4 | 292.0 |
| Ethylene glycol | — | 170.0 |
| Maleic anhydride | 196.1 | 343.0 |
| Phthalic anhydride | — | 111.0 |

|  | Polyester A | Polyester B |
|---|---|---|
| Adipic acid | — | 109.0 |
| p-t-butyl catechol | 0.02 | 0.02 |
| Acid No. | 45 | 25 |
| Styrene | 30% of composition | 30% of composition |

As is conventional in the art, the styrene can be 20 to 50 percent of the total composition. In place of styrene, there can be used other ethylenically unsaturated compounds such as diallyl phthalate, triallyl isocyanurate, acrylamide, N-t-butylacrylamide, triallyl cyanurate, p-vinyl toluene, acrylonitrile, alpha methyl styrene, divinyl benzene, N-vinyl pyrrolidone, methyl acrylate, methyl methacrylate, allyl diglycol carbonate, trimethylolpropane diallyl ether, trimethylolpropane monoallyl ether, allyl ethers of sorbitol, pentaerythritol, sucrose and glucose. Any of the polybasic acids and polyhydric alcohols employed in making alkyd resins can be incorporated as components in making the unsaturated polyester resins.

Water thinnable unsaturated polyester formulations can be used, e.g. those shown in Ghosh U.S. Pat. No. 3,463,750 (the entire disclosure of Ghosh is incorporated by reference). A typical formula is that shown in Ghosh example 1 made from 108 parts trimellitic anhydride, 118 parts phthalic anhydride, 108 parts trimethylolpropane and 269 parts trimethylolpropane-diallyl ether having an acid no. of 50–52 and dissolved in 30 parts isopropanol, 60 parts of 28 percent aqueous ammonia, 390 parts of water and 90 parts t-butyl alcohol. This solution at 45 percent solids is hereinafter called Polyester formulation J.

The following examples illustrate the preparation of the novel compounds of the present invention, their use as promoters for ketone aldol condensation reactions and the advantages of drying alkyd paint and varnish compositions and unsaturated polyester formulations containing the accelerators and catalysts of the present invention.

The standard procedure for evaluating films was the determination of time until the film was dust free and thorough hard. These times were determined in the following manner. Within 24 to 48 hours after preparation of the formulation, a film was applied on a polished plate glass panel by means of a 0.006 inch "Bird" applicator delivering a wet film thickness of 0.003 inch. The film was allowed to dry in an environmental room at constant temperature and humidity, illuminated by artificial light and allowing 95 percent reproducibility. The drying times of the film were determined by the improved Gardner circular drying time recorder over a period of 24 hours. The recorder basically consists of a synchronous motor with its shaft oriented in the true vertical. A pivotable arm assembly is attached to this shaft and operates a counterpoised vertical stylus consisting of a thermosetting teflon sphere which does not stick to the drying film. When the stylus, set in motion by the motor, no longer leaves a clear channel but begins to rupture the dry upper layer of the film, the surface may be considered to be "dust free." When the stylus no longer ruptures the film but moves freely on its surface, the film may be considered "thorough hard."

EXAMPLE 1

Cobalt II halides trihydrazine complexes were prepared by the following general procedure: 0.02 mole of cobalt II halide 2,2'-bipyridine complex or cobalt II halide azine complex was dissolved in 50 g of dimethyl formamide. To this solution was added under strong agitation and under exclusion of air 0.06 mole of anhydrous hydrazine diluted in 50 g. of dimethyl formamide. The reaction product precipitated readily, was filtered and dried in vacuo. The dry trihydrazine complexes are unstable when exposed to air but can be stored in ampoules under nitrogen. Table I summarizes several preparations of such complexes and reports the analytical data relevant to those of the compounds which could be handled safely. All compounds were spectrographed in the infra-red on a Perkins Elmer Infracord Model 337 by means of KBr wafer. All spectra showed a medium to strong absorption band at 970 $cm^{-1}$ characteristic of the bidentate character of the hydrazine ligand.

Phenyl hydrazine was chosen as the standard substituted hydrazine in the preparations and it was found that even the relatively large size of the aromatic ring did not prevent the formation of the octahedral complex with cobalt II chloride.

The cobalt II tri (phenylhydrazinate) dichloride was obtained in quantitative yields by reacting a solution of 6.4 grams (0.02 mole) of (cyclohexanoneazine) cobalt II chloride in 50 ml of dimethyl formamide with 9.1 grams of phenylhydrazine. It was salmon pink in color and unstable in air but less explosive than the tris hydrazinates.

Cobalt II trihydrazinate dibromide [Co(II)—$(N_2H_4)_3$]$Br_2$ and Cobalt II trihydrazinate diiodide [Co(II) $(N_2H_4)_3$]$I_2$ were prepared by the procedure outlined above but could not be analyzed because of their tendency to decompose violently in air. Infra-red spectrography, however, confirmed the bidentate character of this ligand.

EXAMPLE 2

51 Grams of cobalt II dihydrazinate dichloride (a known compound) was prepared from cobaltous chloride and hydrazine hydrate was prepared by conventional procedure and suspended in 414 grams of cyclohexanone and refluxed for two hours until the reflux temperature reached 190°–195°C. At this point the complex was in solution in a mixture of cyclohexanone and cyclohexanone aldol polycondensation products. This solution contained approximately 4 percent cobalt and was useful as an active catalyst in curing drying oil Table I

|  | Calculated | | | |
|---|---|---|---|---|
|  | Found | | | |
|  | Co | N | H | Cl |
| [Co(II) $(N_2H_4)_3$]$Cl_2$ | 26.1 | 37.1 | 5.3 | 31.4 |
|  | 26.04 | 34.95 | 5.1 | 31.4 |
| Infra-red spectra | 3195 vs, 3090 vs, 2175 w, | | | |
|  | 1620 vs, 1590 vs, 1400 s, | | | |
|  | 1310 s, 1220 s, 1160 vs, | | | |
|  | 970 s, 620 m, 565 vs, 518 m. | | | |
| [Co(II) $(C_6H_5—NH—NH_2)_3$]$Cl_2$* | 13.0 | 18.5 | 5.3 | 15.5 |
|  | 10.81 | 18.6 | 6.08 | 13.11 |

*Carbon: Calculated: 47.7%; Found: 48.8%

The cobalt II trihydrazinate dichloride was prepared using as reactants 0.02 mole of cobalt II, 2,2'-bipyridine dichloride complex and 0.06 mole of anhydrous hydrazine in the manner indicated supra. [It was also prepared by dissolving 6.4 grams (0.02 mole) of (cyclohexanone azine) cobalt II chloride in 50 ml of dimethyl formamide and adding thereto, under strong agitation, a solution of 3.0 grams of anhydrous hydrazine in 50 ml of dimethyl formamide. The immediately formed pale orange precipitate was filtered and washed with anhydrous ether. The cobalt II trihydrazinate dichloride was obtained in quanitative yields and analyzed Co 26.04; Cl 31.4 percent, N 33.0 percent, H 5.01 percent. (The starting cyclohexanone azine) Cobalt II chloride was prepared by adding as solution of 0.1 mole of anhydrous cobalt II chloride in 50 ml of dry acetone, slowly, under agitation to a solution of 19.2 grams (0.1 mole) of cyclohexanone azine in 50 ml of dry acetone at room temperature and collecting precipitate which formed.]

While the cobalt II trihydrazinate dichloride is unstable in air and can decompose violently, it can be stored in ampoules under nitrogen and kept refrigerated for several days.

modified alkyd resins and as an activator for a crosslinkable unsaturated polyester resin.

When the refluxing is continued for several more hours above 200°C, extensive polycondensation of the cyclohexanone occurs and polycyclohexene can be precipitated by addition of hexane to the reaction mixture. The polymer was characterized by infra-red analysis.

EXAMPLE 3

2.5 g of cobalt II bromide dihydrazine complex [Co(II) $(N_2H_4)_2$]$Br_2$ was suspended in 250 g of cyclohexanone and the reaction mixture was refluxed for 3 hours until the reflux temperature reached 275°C and 23 g of water had been eliminated. The final product was distilled under vacuum to yield 184 g of pure 1-cyclohexene-2-cyclohexanone (81 percent theory) characterized by elemental analysis, infra-red analysis and physical properties.

EXAMPLE 4

The polymerization of 50 g of LAMINAC 4152 (a styrene modified rigid polyester resin of low reactivity and of medium molecular weight, viscosity 4–5 poises at 77°C., manufactured by the American Cyanamid Co.), was initiated by the addition of 0.5 g of methyl ethyl ketone peroxide and 0.5 g of a 6 percent (as cobalt metal) solution of the respective cobalt II halide hydrazine complexes of Table 2 in cyclohexanone.

The gel time for each sample was determined at 22°C on a comparative viscosimeter capable of measuring the length of time required to reach the point of gelation. The cure time and peak exotherm were determined on a WEST single pen recording potentiometer. One sample was accelerated with 0.5 g of cobaltous naphthenate (6 percent Co) and used as a control.

Table 2

| Accelerators | Min. Gel Time | Min. Cure Time | °C Peak Exotherm |
|---|---|---|---|
| [Co(II) (N$_2$H$_4$)$_2$] Cl$_2$ | 2 | 26 | 116 |
| [Co(II) (N$_2$H$_4$)$_2$] Br$_2$ | 5 | 20 | 104 |
| [Co(II) (N$_2$H$_4$)$_3$] Cl$_2$ | 0.2 | <10 | — |
| [Co(II) (C$_6$H$_4$—NH—NH$_2$)$_2$] Cl$_2$ | 4 | 29 | — |
| Cobalt Naphthenate | 15 | 57 | 88 |

In place of the LAMINAC 4152 in example 4, the use of Polyester A gives similar results.

EXAMPLE 5

The experiment of example 4 was repeated using very low levels of the catalyst-accelerator system at 22°C. The 50 g of LAMINAC 4152 resin containing 0.05 g of tertiary butyl hydroperoxide and 0.1 g of a benzaldehyde solution of cobalt II chloride dihydrazine complex [Co(II) (N$_2$H$_4$)$_2$]Cl$_2$ (6 percent Co) gelled in 16 minutes and cured in 105 minutes whereas under similar conditions the resin containing 0.1 g of cobalt naphthenate (6 percent Co) instead of the hydrazine complex had a gel time of several hours and did not cure after several days. Similar results are obtained where Polyester A is substituted for the LAMINAC 4152.

EXAMPLE 6

50 g of CX 586, a high molecular weight, low reactivity styrene modified polyester resin manufactured by the Chevron Chemical Co., was catalyzed at 22°C with 0.5 g of benzoyl peroxide and 0.5 g of cobalt (II) chloride dihydrazinate (6 percent Co) in solution in dimethyl acetamide to give a cured resin in a short period of time. Similar results are obtained when Polyester I is substituted for the CX 586.

EXAMPLE 7

0.5 g of cobalt (II) chloride trihydrazinate was suspended and dispersed in 50 g of LAMINAC 4152 resin. 0.5 g of benzoyl peroxide was then added to the system and the gel time and cure time were determined as in example 4. A gel time of 2 hours and a cure of 4 hours was obtained whereas a similar resin containing the peroxide but no accelerator could not gel nor cure after 24 hours.

The dihydrazinate analog led respectively to a gel time of 3 hours and a cure time of 5 hours as shown in Table 3.

Table 3

| Accelerator (Solid) | Gel Time Hours | Cure Time Hours |
|---|---|---|
| [Co(II) (N$_2$H$_4$)$_3$] Cl$_2$ | 2 | 4 |
| [Co(II) (N$_2$H$_4$)$_2$] Cl$_2$ | 3 | 5 |
| No accelerator | >24 | >24 |

Similar results are obtained when Polyester A is substituted for LAMINAC 4152.

EXAMPLE 8

A typical long oil alkyd test formulation was prepared consisting of (a) a grind containing 1265 g of titanium dioxide, 1000 g of 505-70 alkyd resin, (a pure soya based long oil alkyd resin having about 63 percent soya oil and 23 percent phthalic anhydride, Acid No. 10 maximum, manufactured by the McCloskey Varnish Co.), 115 g of "Rule 66" Mineral Spirit and (b) a let down containing 1145 g of the same 505-70 alkyd vehicle and 500 g of the same "Rule 66" solvent. To 50 g of the above composition was added 0.05 g of methyl ethyl ketoxime as an anti-skinning agent, and 0.4 g of a cyclohexanone solution of the respective cobalt halide hydrazine complexes reported in Table 4. (The solutions were standardized at a 6 percent cobalt content.) All systems were evaluated under the standard procedure set forth above, at a room temperature of 32°C and 30 percent humidity and compared to two similar systems, one containing 0.4 g of cobalt octoate (6 percent Co) as drier, the other containing no drier. The results are summarized in table 4.

Table 4

| Drying Catalysts | Dust Free Hours | Through Hardness Hours |
|---|---|---|
| [Co(II) (N$_2$H$_4$)$_3$] I$_2$ | 9 | 21 |
| [Co(II) (N$_2$H$_4$)$_3$] Cl$_2$ | 3 | 20 |
| [Co(II) (N$_2$H$_4$)$_2$] Cl$_2$ | 3 | 8 |
| [Co(II) (N$_2$H$_4$)$_2$] Cl$_2$ powder* | 15 | 24 |
| Cobalt Octoate | 4 | 22 |
| No Catalyst | Wet | Wet |

*0.08 g of solid was used, prorated for a metal content equivalent to that of the other systems.

The powdered cobalt II dihydrazinate dichloride did not perform as well as the solution because it decomposed upon standing in air.

In place of the 505-70 alkyd resin in example 8, the same amount of Alkyd I gives similar results.

EXAMPLE 9

The drying of 50 g of the basic formulation of example 8 but containing no titanium dioxide pigment and no antiskinning agent was catalyzed by the addition of 0.4 g of acetic anhydride solution (6 percent Co) of the two cobalt-hydrazine complexes reported in table 5 and these systems were compared to an uncatalyzed system.

Table 5

| Catalysts | Dust Free Hours | Through Hard Hours |
|---|---|---|
| No catalyst | Wet | Wet |
| [Co(II) (C$_6$H$_5$—NH—NH$_2$)$_2$] Br$_2$ | 2.5 | 14 |
| [Co(II) (C$_6$H$_5$—NH—NH$_2$)$_3$] I$_2$ | 22 | 24 |

In place of the 505-70 alkyd resin in example 9, there can be used the same amount of Alkyd H with similar results.

EXAMPLE 10

50 g of the LAMINAC 4152 polyester resin of example 4 containing 0.5 g of methyl ethyl ketone peroxide as a catalyst and 0.5 g of cobalt naphthenate (6 percent Co) was applied as a 0.003 inch film on a plate glass panel and the drying time was evaluated following the general procedure of example 7 at a room temperature of 22°C. The film was never able to dry and remained tacky for several days.

A similar formulation containing 0.5 g of a benzaldehyde solution of cobalt II chloride dihydrazine complex (6 percent Co) instead of the cobalt naphthenate was able to dry in less than 24 hours, the accelerator having overcome the air inhibition process observed with the prior formulation. Furthermore, the same LAMINAC resin (50 g) containing $[Co(II)(N_2H_4)_2]Cl_2$ as sole catalyst (1.0 g 6 percent Co) (no peroxide) dried within 48 hours, thus showing the ability of the cobalt halide hydrazine complex to initiate free radical formations by using the atmospheric oxygen as a source.

In place of the LAMINAC resin, Polyester A can be used with similar results.

EXAMPLE 11

41.4 Grams (0.6 mole) of hydroxylamine hydrochloride were dissolved in a solution of 13 grams (0.1 mole) of cobaltous chloride in 250 ml of methanol. To this solution was added, dropwise, under agitation and at room temperature, 69 grams (0.6 mole) of freshly distilled benzalhydrazone. The agitation was maintained for 30 minutes and the precipitated purple complex was filtered, washed with ether and air dried. 33 grams of tris (hydrazine hydrochloride) cobalt II chloride of the formula $[(N_2H_4 \cdot HCl)_3 Co(II)]Cl_2$ was obtained (99 percent yield). The product was stable in air and very soluble in water. Quantitative amounts of benzaldehyde and residual hydrazine hydrochloride were isolated by distillation of the methanol filtrate.

The analysis of the tris (hydrazine hydrochloride) cobalt (II) chloride was Co 17.6 percent (theory 17.6 percent), Cl 52.5 percent (theory 52.4 percent), N 24.9 percent (theory 25.1 percent), H 4.4 percent (theory 4.5 percent).

What is claimed is:

1. In a process of forming a polymer by aldol condensation of a ketone the improvement consisting essentially of heating a composition comprising (a) a compound having one of the formulae:
   (1) $[Co(II)(R-NHNH_2)_3] X_2$
   (2) $[Co(II)(N_2H_4 \cdot HX)_3] X_2$ and
   (3) $[Co(II)(R-NHNH_2)_2] X_2$ where R is H, alkyl, aralkyl, aryl or haloaryl and X is halogen as a catalyst and (b) said ketone as solvent for said compound (a) until polymerization of the ketone occurs, wherein the ketone is selected from the group consisting of acetone, methyl ethyl ketone, methyl amyl ketone, isophorone, diethyl ketone, di-n-propyl ketone, diisopropyl ketone, di-n-butyl ketone, diisobutyl ketone, di sec butyl ketone, di-n-amyl ketone, methyl-n-propyl ketone, pinacolone, 6-methyl-2-heptanone, methyl n-octyl ketone, ethyl n-butyl ketone, 1-hydroxy-2-propanone, 3-hydroxy-2-butanone, diacetone alcohol, cyclobutanone, cyclohexanone, 2-methyl cyclohexanone, cycloheptanone, fenchone, acetophenone, biacetyl, acetyl propionyl, acetyl acetone, mesityl oxide and hexanone-3.

2. A process according to claim 1 wherein the catalyst is present in an amount to provide 0.001 to 10 percent of cobalt based on the ketone.

3. A process according to claim 1 wherein compound (a) has formula (2).

4. A process according to claim 1 wherein the ketone is cyclohexanone.

5. A process according to claim 4 wherein R is hydrogen and X is chlorine.

6. A process according to claim 1 wherein compound (a) has formula (1).

7. A process according to claim 6 wherein R is hydrogen.

8. A process according to claim 1 wherein compound (a) has formula (3).

9. A process according to claim 8 wherein R is hydrogen.

* * * * *